United States Patent [19]

Yoshimura et al.

[11] Patent Number: 5,382,627
[45] Date of Patent: Jan. 17, 1995

[54] POLYPHENYLENE ETHER RESIN COMPOSITION

[75] Inventors: Masaji Yoshimura; Kazuharu Kanezaki; Takashi Satoh; Tomoyuki Nakata, all of Yokohama; Minoru Takiguchi, Shimonoseki, all of Japan

[73] Assignee: Mitsui Toatsu Chemicals, Inc., Tokyo, Japan

[21] Appl. No.: 100,218

[22] Filed: Aug. 2, 1993

[30] Foreign Application Priority Data

Aug. 5, 1992 [JP] Japan .................. 4-208843
Dec. 9, 1992 [JP] Japan .................. 4-329699

[51] Int. Cl.$^6$ ................ C08L 25/14; C08L 71/12
[52] U.S. Cl. .................... 525/132; 524/508; 524/523; 525/392; 525/397
[58] Field of Search .......... 525/132, 397; 524/508, 524/523

[56] References Cited

U.S. PATENT DOCUMENTS

| | | | |
|---|---|---|---|
| 4,197,370 | 4/1980 | Fox et al. | 525/132 |
| 4,772,653 | 9/1988 | McKenna | 524/427 |
| 5,019,626 | 5/1991 | Taubitz et al. | 525/92 |
| 5,214,109 | 5/1993 | Gallucci et al. | 525/397 |
| 5,216,089 | 6/1993 | Gallucci et al. | 525/397 |

FOREIGN PATENT DOCUMENTS 281916 9/1988 European Pat. Off. .

*Primary Examiner*—James J. Seidlick
*Assistant Examiner*—Thomas Hamilton, III
*Attorney, Agent, or Firm*—Burns, Doane, Swecker & Mathis

[57] ABSTRACT

A polyphenylene ether resin composition containing (A) 100 parts by weight of a polyphenylene-ether-base resin composed of 100-60 wt. % of a polyphenylene ether resin and 0-40 wt. % of a polystyrene resin and (B) 1-40 parts by weight of a dicarboxylic acid ester copolymer obtained from a vinyl monomer and an unsaturated dicarboxylic acid ester as copolymerizable components. The dicarboxylic acid ester copolymer has a weight average molecular weight not greater than 60,000. The polyphenylene ether resin composition, if necessary, can further comprise (C) 1-40 parts by weight of conductive carbon or an A-B-A' type or A-B'-B'' type block copolymer elastomer. Owing to its excellent mechanical properties, heat resistance and moldability, the resin composition is useful in the fields of automotive vehicles, home electronic or electric appliances and industrial parts or components.

2 Claims, No Drawings

POLYPHENYLENE ETHER RESIN COMPOSITION

BACKGROUND OF THE INVENTION a) Field of the Invention

This invention relates to a polyphenylene ether resin composition which, while retaining the inherent high heat distortion point of polyphenylene ether resin, is excellent in formability such as moldability and extrudability (hereinafter collectively called "moldability"), does not give off an unpleasant offensive odor in the course of production thereof and can form injection-molded articles free of silver streaks.

b) Description of the Related Art

Polyphenylene ether resin is considered to be highly attractive as an extremely useful engineering plastic for its electrical and mechanical properties, high heat distortion temperature and self-extinguishing properties. Due to its high melting point and high melt viscosity, however, polyphenylene ether resin requires high temperature and pressure upon molding or processing, thereby making its melt molding or processing difficult. As a method for improving the moldability and processability of polyphenylene ether resin, it has been attempted to blend one or more other resins. Blending of a polystyrene resin is widely known. For example, Japanese Patent Publication No. 19812/1968 discloses a polyphenylene ether resin which composes a blend of polyphenylene ether resin and a high-impact polystyrene resin. This composition is widely known in the name of "Noryl" (trade mark; product of General Electric Company). Although it has improved moldability, processability and impact strength, the moldability and processability are still insufficient. Moreover, a substantial drop is observed in heat distortion temperature as a result of the blending.

As another method for improving polyphenylene ether resin, it has been investigated to add a plasticizer to polyphenylene ether resin. For example, Japanese Patent Publication No. 5220/1984 indicates that improved moldability and processability are available by blending a compound, which has good compatibility with polyphenylene ether resin and is selected from aromatic organic acid esters, aromatic-group-containing polyesters, aromatic-group-containing organophosphoric acid esters and chlorinated aromatic hydrocarbons, with a composition of polyphenylene ether resin and a polystyrene resin. This method is however accompanied by the problem that thermal performance of polyphenylene ether resin, such as the heat distortion temperature, is substantially lowered by the blending of plasticizer although the moldability and processability are improved.

Japanese Patent Laid-Open Application No. 110454/1975 discloses inter alia addition of a low molecular-weight polystyrene to polyphenylene ether resin. Although the addition of such a low molecular weight polystyrene can improve the moldability and processability to some extent, unpleasant offensive odor occurs in the course of its production in which the polyphenylene ether resin and the low molecular weight polystyrene are molten and kneaded and then pelletized so that long term work is difficult. Presumably, as the resins are molten and kneaded at a temperature as high as 250° C. or higher, the low molecular polystyrene undergoes thermal decomposition, thereby producing gas such as styrene oligomers. Further, many silver streaks are observed in injection-molded products so that their values as commercial products may be impaired in certain instances. The utility of polyphenylene ether resin is recently spreading to the electric and electronic fields. Prevention of static electrification is required in some instances so that conductive carbon may be added. Conductive carbon however substantially reduces the fluidity and, even when low molecular weight polystyrene is added, injection molding at a temperature as high as 300° C. or higher is needed. In addition, many silver streaks occur so that no satisfactory molded product can be obtained. Further, because polyphenylene ether resin and low molecular weight polystyrene are fully compatible with each other, the heat distortion temperature drops in proportion with the amount of the low molecular weight polystyrene added.

U.S. Pat. No. 4,826,919 discloses inter alia addition of low molecular weight polystyrene and an α-methylstyrene copolymer to a composition of polyphenylene ether resin and a polystyrene resin. Although the drop in heat distortion temperature is small and the moldability and processability are improved to a certain extent, unpleasant offensive odor is given off during the pelletization step and the resulting injection molded product presents many silver streaks, thereby substantially impairing its value.

As is understood from the foregoing, in the field of polyphenylene ether resin compositions, no composition has been obtained yet with excellent balance between heat distortion temperature and moldability and processability and without giving off unpleasant offensive odor upon production or showing poor moldability.

OBJECT AND SUMMARY OF THE INVENTION

An object of the present invention is to provide a polyphenylene ether resin composition which, while retaining a high heat distortion temperature, is excellent in moldability and processability, does not give off unpleasant odor in the course of production thereof and forms injection molded products with minimized silver streaks.

With a view to overcoming the above-described problems, the present inventors have conducted extensive research. As a result, it has been found that a resin composition, which can be obtained by adding a specific compound in a particular proportion to polyphenylene ether resin or a polyphenylene ether-base resin and melting and kneading the resultant mixture, can attain the above object, leading to the completion of the present invention.

In one aspect of the present invention, there is thus provided a polyphenylene ether resin composition comprising:

(A) 100 parts by weight of a polyphenylene-ether-base resin composed of 100–60 wt. % of a polyphenylene ether resin and 0–40 wt. % of a polystyrene resin; and (B) 1–40 parts by weight of a dicarboxylic acid ester copolymer obtained from a vinyl monomer and an unsaturated dicarboxylic acid ester as copolymerizable components, said dicarboxylic acid ester copolymer having a weight average molecular weight not greater than 60,000.

Owing to its excellent mechanical properties, heat resistance and moldability, the above-described resin composition is useful in the fields of automotive vehicles, home electronic or electric appliances and industrial parts or components. It is therefore of high utility value.

DETAILED DESCRIPTION OF THE INVENTION

The polyphenylene-ether-base resin (A), which is a major component of the composition according to the present invention, is composed of 100–60 wt. % of a polyphenylene ether resin and 0–40 wt.% of a polystyrene resin. The polyphenylene ether resin is homopolymer or a copolymer of at least one type of recurring units represented by the following formula:

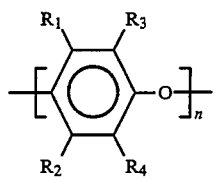

wherein $R_1$, $R_2$, $R_3$ and $R_4$ are independently selected from the group consisting of hydrogen and halogen atoms and hydrocarbon and halohydrocarbon groups, and n indicates the total number of monomer units and stands for an integer of at least 20.

Following the process disclosed in U.S. Pat. Nos. 3,306,874, 3,306,875, 3,257,357 and 3,257358, the polyphenylene resin can be produced using a phenol as a raw material. The particularly preferred polyphenylene ether resin is poly(2,6-dimethyl-1,4-phenylene)ether.

Illustrative polystyrene resins usable in the present invention include polystyrene, high-impact polystyrene, styrene-maleic anhydride copolymer, styrene-acrylonitrile copolymer, styrene-butadiene-acrylonitrile copolymer (ABS), styrene-methyl methacrylate copolymer, and styrene-maleimide copolymer. These polystyrene resins are each mixed in a proportion of 0–40 wt. %, preferably 10–40 wt. % per 100–60 wt. % of the polyphenylene ether resin.

The dicarboxylic acid ester copolymer (B), which is also employed in the present invention, is produced using a vinyl monomer and an unsaturated dicarboxylic acid ester as copolymerizable components. Examples of the vinyl monomer which forms the dicarboxylic acid ester copolymer include aromatic vinyl monomers such as styrene, α-methylstyrene, o-methylstyrene and p-methylstyrene; acrylic acid; methacrylic acid; acrylonitrile; acrylamide; and derivatives thereof. Two or more of these vinyl monomers can be used as a mixture. Preferred examples include styrene and styrene-acrylonitrile mixtures.

The unsaturated dicarboxylic acid ester, the other component, is an ester obtained from an unsaturated dicarboxylic acid and an alcohol. Examples of the unsaturated dicarboxylic acid include maleic acid, maleic anhydride, fumaric acid, chloromaleic acid, itaconic acid, and cis-4-cyclohexene-1,2-dicarboxylic acid. In particular, α,β-unsaturated dicarboxylic acids, specifically maleic acid and maleic anhydride are preferred. Illustrative of the alcohol include methyl alcohol, ethyl alcohol, propyl alcohol, butyl alcohol, cyclohexyl alcohol, lauryl alcohol and stearyl alcohol. As the ester form of the unsaturated dicarboxylic acid ester, diester is particularly preferred.

Regarding the ratio of the vinyl monomer to the unsaturated dicarboxylic acid ester, it is preferred to contain the unsaturated dicarboxylic ester in a range of from 10 wt. % to 80 wt. %, especially in a range of from 20 wt. % to 70 wt. %. In general, proportions smaller than 10 wt. % may not bring about substantial effects for the improvement of unpleasant offensive odor and silver streaking or sufficient effects for the improvement of the balance between heat distortion temperature and moldability and processability.

As to the molecular weight of the dicarboxylic acid ester copolymer, its weight average molecular weight as measured by gel permeation chromatography (GPC) and calculated based on a calibration curve of standard polystyrene is 60,000 or smaller, preferably in a range of from 5,000 to 30,000, inclusive. Weight average molecular weights greater than 60,000 cannot bring about sufficient effects for the improvement of the balance between heat distortion temperature and moldability and processability.

The polyphenylene ether resin composition according to the present invention preferably comprises 100 parts by weight of the polyphenylene-ether-base resin (A) and 1–40 parts by weight, preferably 3–30 parts by weight of dicarboxylic acid ester copolymer obtained from a vinyl monomer and an unsaturated dicarboxylic acid ester as copolymerizable components, said dicarboxylic acid ester copolymer having a weight average molecular weight not greater than 60,000. Proportions of the dicarboxylic acid ester copolymer smaller than 1 part by weight result in poor moldability and processability, whereas proportions greater than 40 parts by weight lead to a significant drop in heat distortion temperature.

No particular limitation is imposed on the production method of the polyphenylene ether resin composition according to the present invention and, in general, a known method can be adopted. Described specifically, the polyphenylene-ether-base resin (A) and the dicarboxylic acid ester copolymer (B) are mixed into a uniform blend by using a high-speed stirrer or the like. The blend is then melted and kneaded at 250° C. or higher in a single-screw or multiple-screw extruder having sufficient kneading ability, followed by pelletization. The pellets are then subjected to injection molding or the like.

To impart antistatic properties to the resin composition according to the present invention, conductive carbon can be used as an additional component (C) in a proportion of 5–40 parts by weight, preferably 10–30 parts by weight. Proportions smaller than 5 parts by weight are too small to impart sufficient antistatic properties, but proportions greater than 40 parts by weight result in poor moldability and processability.

Conductive carbon, when incorporated in a resin, can impart high conductivity, thereby making it possible to produce molded products having a significantly-lowered surface resistance. Acetylene black, furnace black or the like is preferably used. Specific examples of furnace black include commercial products such as "Ketchen Black EC" (trade name; product of Akzo N. V, Holland) and "Columbian Carbon 975" (trade name; Columbian Carbon International Corp., U.S.A.).

To impart high impact strength to molded products to be obtained, the polyphenylene ether resin composition according to the present invention can be added with an AB random block, A-B block, or A-B-A' or A-B'-B" block copolymer elastomer.

The A and A' blocks are each formed of a vinyl-containing aromatic hydrocarbon polymer block, or a hydrogenated, polymerized conjugated diene block. Examples of the vinyl-containing aromatic hydrocarbon include styrene, α-methylstyrene, vinyltoluene, vinylxylene, ethylvinylxylene, vinylnaphthalene, and mixtures thereof. A and A' may be either the same or different. The B block is formed of a conjugated diene polymer. Examples of the conjugated diene include 1,3-butadiene, isoprene and mixtures thereof. The hydrogenated conjugated diene can be used suitably.

The A-B-A' block copolymer elastomer is in the form of a linear or radial block copolymer. The A-B-A' block copolymer elastomer usable in the present invention is commercially available and can be produced by a process well known to those having ordinary skill in the art.

The A-B'-B" block copolymer is composed of polymer blocks A of a vinyl-containing aromatic compound, random copolymer blocks B' of a vinyl aromatic compound and a conjugated diene, and tapered blocks B" of the vinyl aromatic compound and the conjugated diene with the proportion of vinyl aromatic units increasing gradually toward one end of each tapered block. The A-B'-B" block copolymer has been obtained by connecting these blocks in the order of A, B' and B" and then hydrogenating the blocks so connected. Examples of the vinyl aromatic compounds include styrene, t-butyl-styrene, α-methylstyrene, p-methylstyrene, divinylbenzene, 1,1-diphenylstyrene, N,N-diethyl-p-aminoethyl-styrene and vinylpyridine, with styrene and α-methylstyrene being preferably usable. Further, illustrative of the conjugated diene include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene. Of these, 1,3-butadiene and 1,3-pentadiene are preferred, with 1,3-butadiene being more preferred. A-B'-B" type block copolymer elastomers usable in the present invention are commercially available and can also be produced by a process well known to those having ordinary skill in the art.

The above-described A-B type, A-B-A' type and A-B'-B" type block copolymer elastomers are each added in a range of 5-40 parts by weight, preferably 5-20 parts by weight.

In the present invention, it is also possible to add, depending on the application purpose, various elastomers, pigments, dyes, reinforcing materials such as glass fibers, metal fibers and carbon fibers, fillers such as talc and calcium carbonate, antioxidants, ultraviolet absorbers, lubricants, flame retardants, antistatic agents, etc.

Examples of the present invention will hereinafter be set out to describe the present invention in further detail. Physical properties of resin compositions and molded products, said properties being to be described in the Examples and Comparative Examples, were determined in accordance with the following methods:

(1) Determination of Unpleasant Offensive Odor

Each resin composition was ranked in accordance with the following 3-stage ranking system:
A. Operators can work without problems over a long time upon production of the resin composition by melting and kneading the batch.
B. Operators can work only for a few hours.
C. Operators cannot work.

(2) Melt Flow Index

For the evaluation of moldability and processability, the melt flow index of each resin composition was measured using pellets which had been obtained by melting and kneading the resin composition. The greater the value, the better the moldability and processability. The smaller the value, the poorer the moldability and processability. Measuring conditions were set following JIS K7210.

Load: 2.16 kg, temperature: 300° C.

(3) Heat Distortion Temperature

Using pellets which had been obtained by melting and kneading each resin composition, a test piece was prepared by injection molding. The heat distortion temperature of the test piece was measured. Measuring conditions were set following JIS K7207.

Flexural stress: 18.6 kgf/cm$^2$.

(4) Observation of Silver Streaking

Using pellets which had been obtained by melting and kneading each resin composition, silver streaking was observed on each product molded by injection molding. The numbers of streaks on molded products, said numbers being shown in Tables 1 and 2, are each the number of streaks on a surface of a 60×100 mm test piece when the test piece was injection-molded through a pinhole gate having a gate diameter of 0.7 mm. Further, the number of silver streaks shown in Table 3 are those observed on 60×100 mm test pieces injection-molded through a pinhole gate having a gate diameter of 1.0 mm. Test pieces having not more than 5 silver streaks were ranked acceptable.

EXAMPLES 1-3

In each Example, a polyphenylene ether resin (product of GEM polymer Co., Ltd.) as the polyphenylene-ether-base resin (A) and a styrene-dibutyl maleate copolymer (weight average molecular weight: 20,000; dibutyl maleate: 25 wt. %) as the dicarboxylic acid ester copolymer (B) were thoroughly mixed in a tumbling mixer at the ratio shown in Table 1, followed by pelletization at a melt temperature of 280° C. and a screw revolution speed of 100 rpm through a twin-screw extruder having a screw diameter of 30 mm and an L/D ratio of 30. With respect to the above properties (1) to (4), the resulting pellets were evaluated. The results are shown in Table 1.

EXAMPLES 4-6

In each Example, the polyphenylene ether resin (product of GEM polymer Co., Ltd.) and a high-impact polystyrene resin as the polyphenylene ether resin and the styrene resin, both making up the polyphenylene-ether-base resin (A), and the styrene-dibutyl maleate copolymer (weight average molecular weight: 20,000; dibutyl maleate: 25 wt. %) as the dicarboxylic acid ester copolymer (B) were thoroughly mixed in the tumbling mixer at the ratio shown in Table 1, followed by pelletization at a melt temperature of 270° C. and a screw revolution speed of 100 rpm through the twin-screw extruder having a screw diameter of 30 mm and an L/D ratio of 30. With respect to the above properties (1) to (4), the resulting pellets were evaluated. The results are shown in Table 1.

EXAMPLE 7

The procedures of Example 4 were repeated except that a styrene-dimethyl fumarate copolymer (weight average molecular weight: 8,000; dimethyl fumarate: 50 wt. %) was used as the dicarboxylic acid ester copolymer (B) in the proportion indicated in Table 1.

COMPARATIVE EXAMPLES 1–2

In each Comparative Example, the procedures of Example 1 were repeated except that the proportions of the polyphenylene ether resin and styrene-dibutyl maleate copolymer were set outside the respective ranges specified for resin compositions according to the present invention. The results are shown in Table 1. The resin composition so obtained was inferior in the balance between heat resistance and moldability and processability.

COMPARATIVE EXAMPLE 3

The procedures of Example 2 were repeated except that a styrene-dibutyl maleate copolymer (weight average molecular weight: 70,000; dibutyl maleate: 25 wt. %) was used as the dicarboxylic acid ester copolymer (B). The results are presented in Table 1. The composition so obtained was inferior in the balance between heat resistance and moldability and processability.

COMPARATIVE EXAMPLE 4

The procedures of Example 1 were repeated except that a styrene-dibutyl maleate copolymer (weight average molecular weight: 20,000; dibutyl maleate: 5 wt. %) was used as the dicarboxylic acid ester copolymer (B). The results are shown in Table 2. The composition so obtained was inferior in the balance between heat resistance and moldability and processability.

COMPARATIVE EXAMPLE 5

The procedures of Example 2 were repeated except that polystyrene having a number average molecular weight of 20,000 was used in lieu of the styrene-dibutyl maleate copolymer as the dicarboxylic acid ester copolymer (B). The composition so proportioned gave off very unpleasant offensive odor upon production, and many silver streaks were observed on each product molded therefrom. The results are indicated in Table 2.

EXAMPLES 8–9

In each Example, a polyphenylene-ether-base resin (A), which consisted of 60 wt. % of the polyphenylene ether resin (product of GEM polymer Co., Ltd.) as a polyphenylene ether resin and 40 wt. % of the high-impact polystyrene resin as a polystyrene resin, a styrene-dibutyl maleate copolymer (weight average molecular weight: 10,000; dibutyl maleate: 30 wt. %) as a dicarboxylic acid ester copolymer (B) and "Ketchen Black EC" as a conductive carbon were thoroughly mixed in the tumbling mixer at the ratio shown in Table 2, followed by pelletization at a melt temperature of 300° C. and a screw revolution speed of 100 rpm through the twin-screw extruder having a screw diameter of 30 mm and an L/D ratio of 30. With respect to the above properties (1) to (4), the resulting pellets were evaluated. The results are shown in Table 2.

COMPARATIVE EXAMPLE 6

The procedures of Example 8 were repeated except that polystyrene having a number average molecular weight of 10,000 was used in place of the styrene-dibutyl maleate copolymer as the dicarboxylic acid ester copolymer (B). The results are presented in Table 2. The composition so proportioned gave off very unpleasant offensive odor upon production, and many silver streaks were observed on each product molded therefrom.

COMPARATIVE EXAMPLE 7

The procedures of Example 8 were repeated except that a styrene-α-methylstyrene copolymer having a number average molecular weight of 10,000 was used instead of the styrene-dibutyl maleate copolymer as the dicarboxylic acid ester copolymer (B). The results are presented in Table 2. The composition so proportioned gave off very unpleasant offensive odor upon production, and many silver streaks were observed on each product molded therefrom.

EXAMPLES 10–12

In each Example, the polyphenylene ether resin (product of GEM polymer Co., Ltd.) and the high-impact polystyrene resin as the polyphenylene ether resin and the styrene resin, both making up the polyphenylene-ether-base resin (A), a styrene-dibutyl maleate copolymer as the dicarboxylic acid ester copolymer (B) and a styrene-butadiene-styrene copolymer ("Kraton G-1650", trade name; product of Shell Kagaku K. K.) were thoroughly mixed in the tumbling mixer at the ratio shown in Table 3, followed by pelletization at a melt temperature of 300° C. and a screw revolution speed of 100 rpm through the twin-screw extruder having a screw diameter of 30 mm and an L/D ratio of 30. Test pieces were injection-molded from the pellets so produced, and their properties (1) to (4) were evaluated. The results are shown in Table 3.

EXAMPLES 13–15

In each Example, the procedures of Examples 10–12 were repeated except that, in place of the styrene-butadiene-styrene copolymer, a hydrogenated styrene-butadiene rubber ("Dynaron 1910P", trade name; product of Japan Synthetic Rubber Co., Ltd.) was used as an A-B'-B" type block copolymer elastomer in the proportion indicated in Table 3. The results are presented in Table 3.

TABLE 1

| | Composition | | Example 1 | 2 | 3 | 4 | 5 | 6 | 7 | Comp. Ex 1 | 2 | 3 |
|---|---|---|---|---|---|---|---|---|---|---|---|---|
| (A) | Polyphenylene ether resin | (wt. parts) | 100 | 100 | 100 | 80 | 80 | 60 | 80 | 100 | 100 | 100 |
| | Styrene resin | (wt. parts) | — | — | — | 20 | 20 | 40 | 20 | — | — | — |
| (B) | Dicarboxylic acid ester copolymer | (wt. parts) | 5 | 15 | 30 | 5 | 10 | 5 | 5 | 0 | 50 | 15 |
| | Ester content | (wt. %) | 25 | 25 | 25 | 25 | 25 | 25 | 50 | — | 25 | 25 |
| | Weight average molecular weight | ($\times 10^3$) | 20 | 20 | 20 | 20 | 20 | 20 | 8 | — | 20 | 70 |
| | (1) Unpleasant offensive odor | | A | A | A | A | A | A | A | A | A | A |
| | (2) Melt flow index | (g/10 min) | 3 | 6 | 9 | 6 | 9 | 10 | 7 | 0.5 | 12 | 2 |

TABLE 1-continued

| | Composition | | Example 1 | 2 | 3 | 4 | 5 | 6 | 7 | Comp. Ex 1 | 2 | 3 |
|---|---|---|---|---|---|---|---|---|---|---|---|---|
| | (3) Heat distortion temperature | (°C.) | 175 | 155 | 143 | 153 | 143 | 140 | 150 | 184 | 90 | 156 |
| | (4) Number of silver streaks | (streaks) | 0 | 2 | 1 | 0 | 1 | 0 | 1 | 3 | 4 | 5 |

TABLE 2

| | Composition | | Comp. Ex. 4 | Comp. Ex. 5 | Example 8 | Example 9 | Comp. Ex. 6 | Comp. Ex. 7 |
|---|---|---|---|---|---|---|---|---|
| (A) | Polyphenylene ether resin | (wt. parts) | 100 | 100 | 60 | 60 | 60 | 60 |
| | Styrene resin | (wt. parts) | — | — | 40 | 40 | 40 | 40 |
| | Dicarboxylic acid ester copolymer | (wt. parts) | 5 | 15 | 10 | 20 | 10 | 10 |
| (B) | Ester content | (wt. %) | 5 | (polystyrene) | 30 | 30 | (polystyrene) | (styrene -α-methyl styrene copolymer) |
| | Weight average molecular weight | ($\times 10^3$) | 20 | (20) | 10 | 10 | (10) | (10) |
| (C) | Conductive carbon black | (wt. parts) | — | — | 10 | 20 | 10 | 10 |
| | (1) Unpleasant offensive odor | | B | B | A | A | C | C |
| | (2) Melt flow index | (g/10 min) | 3 | 3 | 5 | 5.5 | 1 | 4 |
| | (3) Heat distortion temperature | (°C.) | 160 | 152 | 145 | 150 | 140 | 143 |
| | (4) Number of silver streaks | (streaks) | 7 | 10 | 3 | 4 | 15 | 11 |

TABLE 3

| | Composition | | Example 10 | 11 | 12 | 13 | 14 | 15 |
|---|---|---|---|---|---|---|---|---|
| (A) | Polyphenylene ether resin | (wt. parts) | 90 | 90 | 90 | 90 | 90 | 90 |
| | Styrene resin | (wt. parts) | 10 | 10 | 10 | 10 | 10 | 10 |
| (B) | Dicarboxylic acid ester copolymer | (wt. parts) | 15 | 15 | 15 | 15 | 15 | 15 |
| | Weight average molecular weight | ($\times 10^3$) | 15 | 15 | 15 | 15 | 15 | 15 |
| (C) | Block copolymer elastomer | (wt. parts) | | | | | | |
| | A-B-A' type | | 7 | 10 | 20 | — | — | — |
| | A-B'-B" type | | — | — | — | 7 | 10 | 18 |
| | (1) Unpleasant offensive odor | | A | A | A | A | A | A |
| | (2) Melt flow index | (g/10 min) | 8 | 11 | 13 | 8 | 11 | 13 |
| | (3) Heat distortion temperature | (°C.) | 143 | 141 | 140 | 143 | 141 | 140 |
| | (4) Silver streaking | | accept. | accept. | accept. | accept. | accept. | accept. |

We claim:

1. A polyphenylene ether resin composition comprising:
   (A) 100 parts by weight of a polyphenylene-ether-base resin composed of 100–60 wt. % of a polyphenylene ether resin and 0–40 wt. % of a polystyrene resin; and
   (B) 1–40 parts by weight of a dicarboxylic acid ester copolymer obtained from a vinyl monomer and an unsaturated dicarboxylic acid ester as copolymerizable components wherein the proportion of the unsaturated dicarboxylic acid ester in the dicarboxylic acid ester copolymer (B) is in a range of from 10 wt. % to 80 wt. %, said dicarboxylic acid ester copolymer having a weight average molecular weight not greater than 60,000.

2. A resin composition of claim 1, further comprising:
   (C) 5–40 parts by weight of conductive carbon.

* * * * *